United States Patent
Suzuki et al.

(10) Patent No.: US 7,321,477 B2
(45) Date of Patent: Jan. 22, 2008

(54) DISK CONTROL APPARATUS, DISK CONTROL METHOD, AND COMPUTER PRODUCT

(75) Inventors: Atsushi Suzuki, Kawasaki (JP); Yukio Abe, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/335,127

(22) Filed: Jan. 19, 2006

(65) Prior Publication Data

US 2007/0070542 A1   Mar. 29, 2007

(30) Foreign Application Priority Data

Sep. 26, 2005   (JP)   ............................. 2005-278571

(51) Int. Cl.
  *G11B 19/04*   (2006.01)
  *G11B 19/02*   (2006.01)
  *G11B 5/596*   (2006.01)
(52) U.S. Cl. ..................... 360/60; 360/69; 360/78.04
(58) Field of Classification Search ..................... None
  See application file for complete search history.

(56) References Cited

U.S. PATENT DOCUMENTS

| 6,115,200 | A  | * | 9/2000 | Allen et al. | 360/60 |
| 6,510,014 | B2 | * | 1/2003 | Kikuta et al. | 360/60 |
| 6,999,260 | B2 | * | 2/2006 | Abe et al. | 360/60 |

FOREIGN PATENT DOCUMENTS

| JP | 6-309824 | 11/1994 |
| JP | 10-40642 | 2/1998 |
| JP | 10-124993 | 5/1998 |
| JP | 11-126412 | 5/1999 |
| JP | 2000-322812 | 11/2000 |
| JP | 2005-004907 | 1/2005 |
| WO | WO 00/68938 | 11/2000 |

* cited by examiner

*Primary Examiner*—Andrew L. Sniezek
(74) *Attorney, Agent, or Firm*—Greer, Burns & Crain, Ltd.

(57) ABSTRACT

A disk control apparatus controls a disk driving unit that performs read/write of data with a head. A vibration detecting unit detects a vibration of the disk driving unit. A disk control unit controls the disk driving unit based on the detected vibration.

14 Claims, 12 Drawing Sheets

FIG. 8

| TPI MARGIN SLICE 1 | TPI MARGIN SLICE 2 | TPI MARGIN SLICE 3 | TPI MARGIN SLICE 4 | TPI MARGIN SLICE 5 |
|---|---|---|---|---|
| OFF-TRACK SLICE 1 | OFF-TRACK SLICE 2 | OFF-TRACK SLICE 3 | OFF-TRACK SLICE 4 | OFF-TRACK SLICE 5 |

FIG. 9

| CUSTOMIZATION LEVEL | LOW TEMPERATURE | ROOM TEMPERATURE |
|---|---|---|
| 0 | 95% | 95% |
| 1 | 80% | 90% |
| 2 | 70% | 80% |

FIG.11

| INTERVAL [ms] | RATE OF WRITE FAULT OCCURRENCE [%] |
|---|---|
| 0-50 | 14 |
| 50-100 | 40 |
| 100-150 | 62 |
| 150-200 | 4 |
| 200-250 | 6 |
| 250-300 | 71 |
| 300- | 100 |

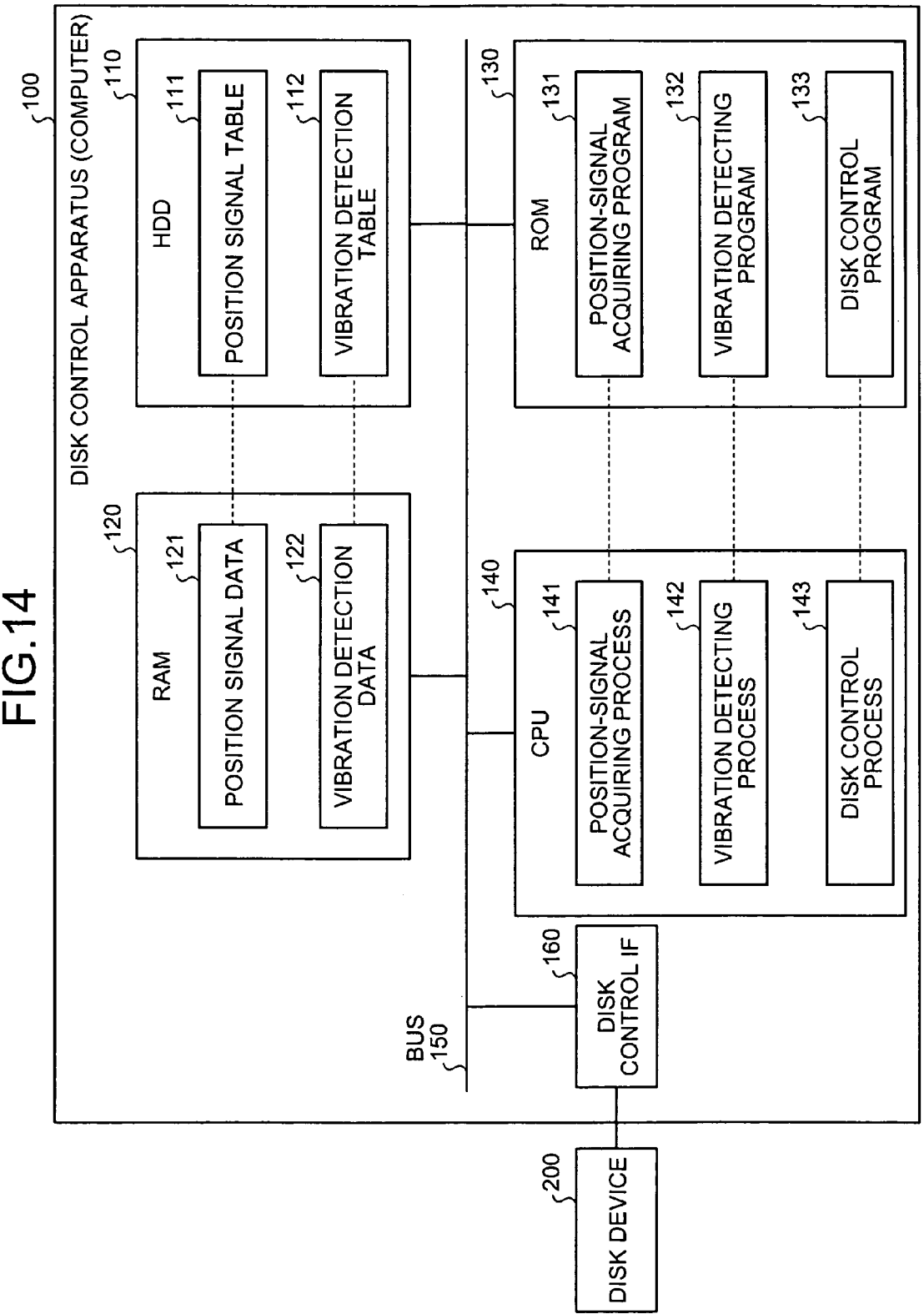

DISK CONTROL APPARATUS, DISK CONTROL METHOD, AND COMPUTER PRODUCT

BACKGROUND OF THE INVENTION

1. Field of the Invention

The present invention relates to a technology for controlling a disk driving unit that performs read/write of data.

2. Description of the Related Art

Conventionally, a disk control apparatus for controlling a disk device (a driving unit) detects a mechanical shock from the outside using a shock sensor to achieve an accurate read/write processing for the disk device. This type of conventional disk control apparatus is disclosed in Japanese Patent Application Laid-Open No. 2005-4907.

When a shock from the outside is detected by the shock sensor, the disk control apparatus controls the disk device to stop writing of data in a magnetic disk.

In the conventional technology, although it is possible to detect a temporary shock from the outside with the shock sensor, it is impossible to detect vibration caused by swing of the disk device itself (e.g., swing of the disk device due to vibration of an acoustic apparatus near the disk device). Thus, it is impossible to appropriately control the disk in a vibrating state. In other words, when a usual disk control is performed without taking into account the vibration in the vibrating state, a write failure due to a reassign operation or a write-out on an alternate primary side occurs. This causes time for a subsequent power supply ON/OFF to be delayed, or an unrecoverable sector to be generated.

SUMMARY OF THE INVENTION

It is an object of the present invention to at least solve the problems in the conventional technology.

A disk control apparatus according to one aspect of the present invention controls a disk driving unit that performs read/write of data with a head. The disk control apparatus includes a vibration detecting unit that detects a vibration of the disk driving unit; and a disk control unit that controls the disk driving unit based on the detected vibration.

A method according to another aspect of the present invention is for controlling a disk driving unit that performs read/write of data with a head. The method includes detecting a vibration of the disk driving unit; and controlling the disk driving unit based on the detected vibration.

A computer-readable recording medium according to still another aspect of the present invention stores a computer program that causes a computer to execute the above method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a table of correspondence between a TPI margin and a write off track slice, according to a second embodiment of the present invention;

FIG. 9 is a table of setting for a write off track slice corresponding to a temperature and a customization level, according to the second embodiment;

FIG. 11 is a table for explaining a rate of write fault occurrence with time, according to the second embodiment;

FIG. 14 is a block diagram of a computer that executes a disk control program.

DETAILED DESCRIPTION OF THE PREFERRED EMBODIMENTS

Exemplary embodiments of the present invention are explained below in detail with reference to the accompanying drawings.

Figure 1:
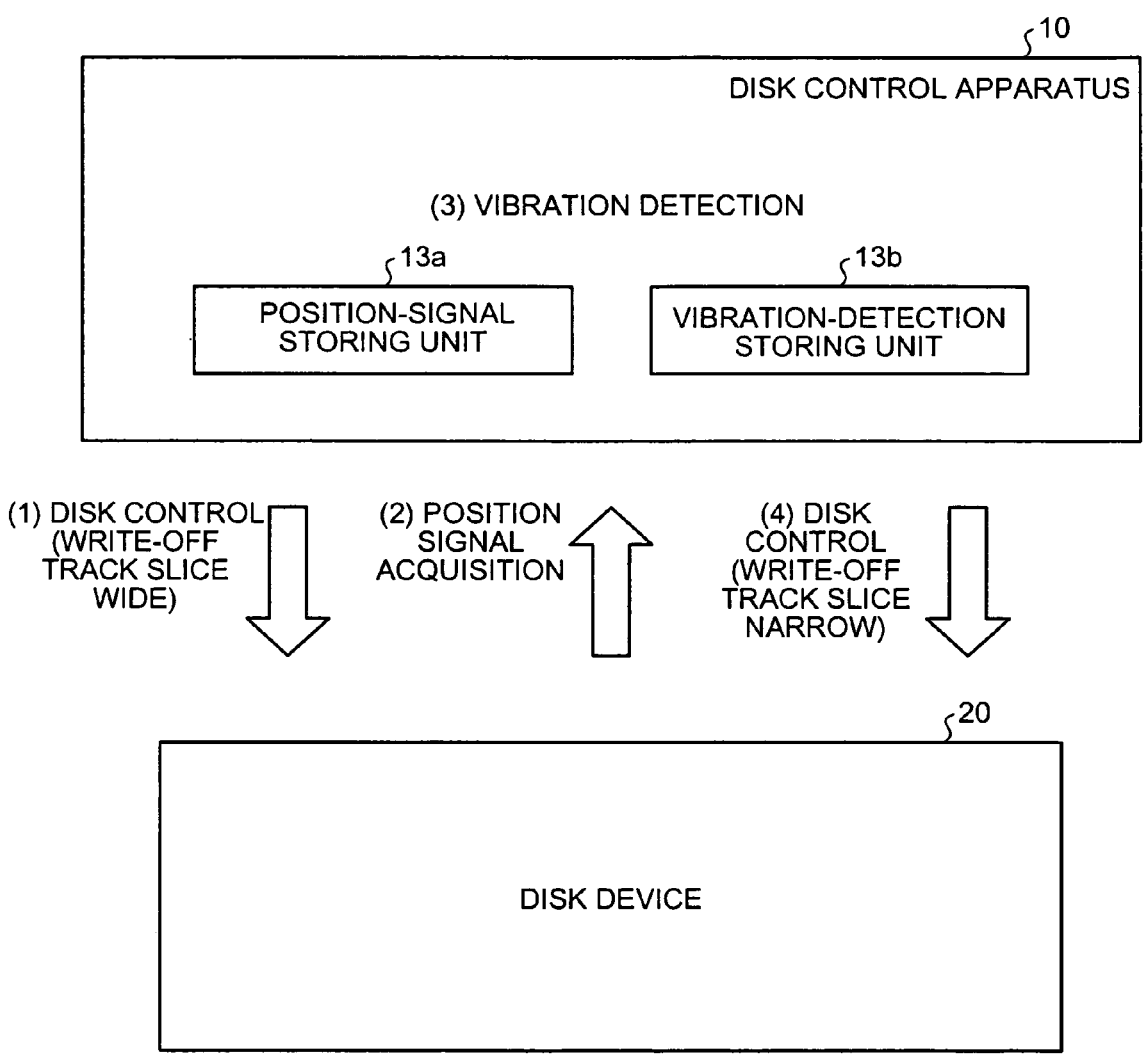
FIG. 1 is a schematic for explaining an outline and a characteristic of a disk control apparatus according to a first embodiment of the present invention.

FIG. 1 is a schematic for explaining an outline and a characteristic of a disk control apparatus 10 according to a first embodiment of the present invention.

The disk control apparatus 10 controls a disk device (a disk driving unit) that performs read/write of data. The disk control apparatus 10 can appropriately perform disk control in a vibration state (e.g., a state in which the disk device is vibrating because of vibration of an acoustic apparatus or the like near the disk device).

At normal time, the disk control apparatus 10 sets a write off track slice lax, that is, at a first level and, when a position signal exceeds the write off track slice at the first level, controls a disk device 20 to stop data write under execution (see (1) in FIG. 1). The disk control apparatus 10 acquires a position signal (a signal indicating a position of a head for performing read/write of the disk device 20) and stores the position signal in a position-signal storing unit 13a (see (2) in FIG. 1). The disk control apparatus 10 stores detection data obtained by filtering the position signal stored with a low-pass filter in a vibration-detection storing unit 13b. The disk control apparatus 10 repeats the processing described above.

On the other hand, when vibration caused in the disk device 20 is detected based on the vibration detection data stored (see (3) in FIG. 1), the disk control apparatus 10 sets a write off track slice strict, that is, at a second level lower than the first level and, when a position signal exceeds the write off track slice at the second level, controls the disk device 20 to stop data write under execution or transmission processing (see (4) in FIG. 1). In other words, when vibration is detected, the disk control apparatus 10 controls the disk device 20 to make a condition for stopping write of data in the disk device stricter than that at the normal time. Values of the write off track slices at the first and the second levels are registered in a memory in advance and set and changed by a program.

As described above, according to the first embodiment, the disk control apparatus 10 detects vibration caused in the disk device and controls the disk device according to the vibration detected. Thus, it is possible to appropriately perform disk control in a vibration state. In other words, it is possible to prevent write failure due to a reassign operation, write-out on an alternate primary side, and the like.

Figure 2:
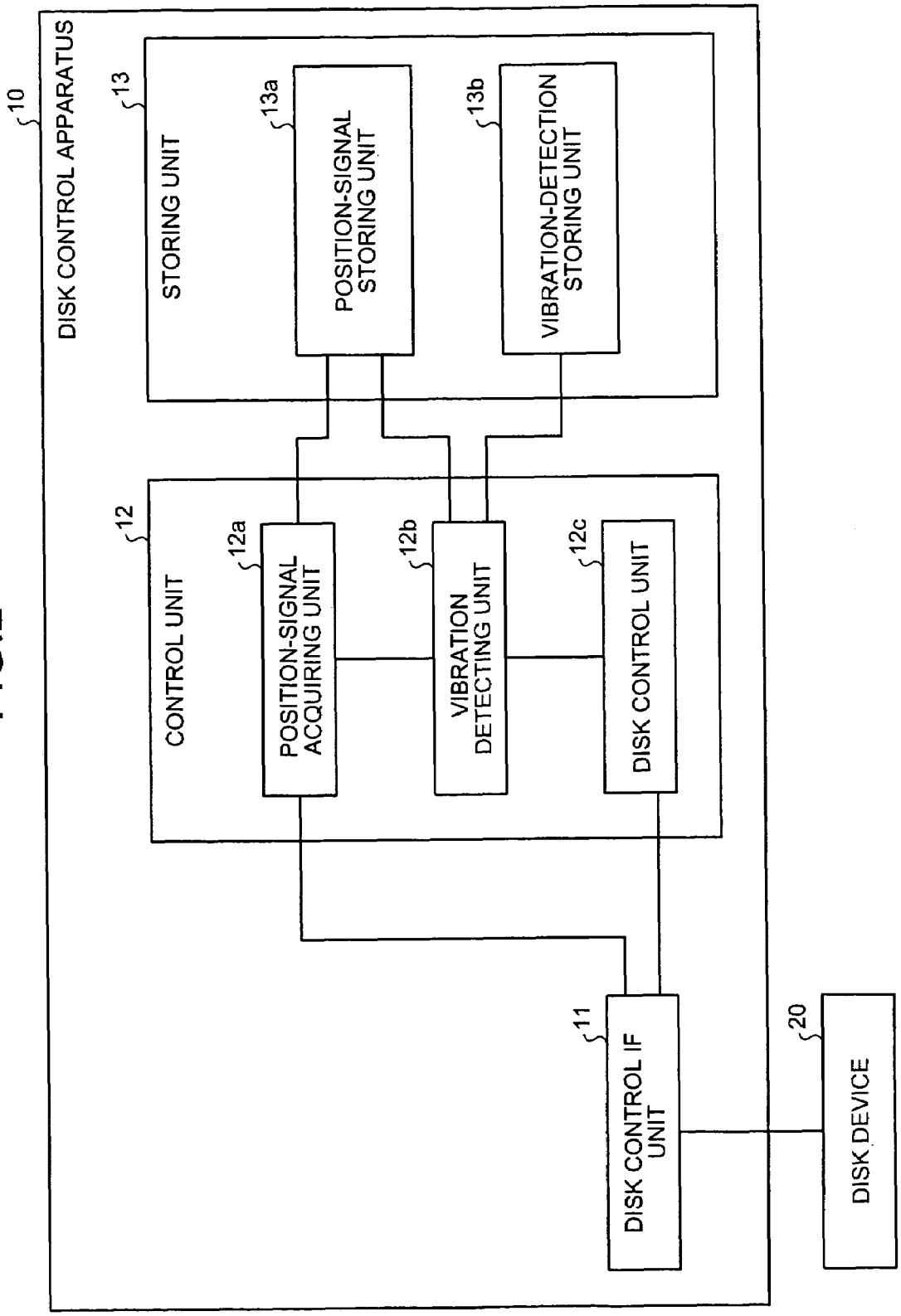
FIG. 2 is a block diagram of a disk control apparatus according to the first embodiment.

FIG. 2 is a block diagram of the disk control apparatus 10 according to the first embodiment. The disk control apparatus 10 is connected to the disk device 20 via a bus or the like.

The disk control apparatus 10 includes a disk control IF unit 11, a control unit 12, and a storing unit 13.

The disk control IF unit 11 is a unit that controls communication concerning various kinds of information that are exchanged between the disk control apparatus 10 and the disk device 20. For example, the disk control apparatus 10 exchanges information such as a position signal (a signal indicating a position of a head for performing read/write of the disk device 20) with the disk device 20.

The storing unit 13 is storing unit that stores data and programs necessary for various kinds of processing by the control unit 12. The storing unit 13 includes the position-signal storing unit 13a and the vibration-detection storing unit 13b.

Figure 4:
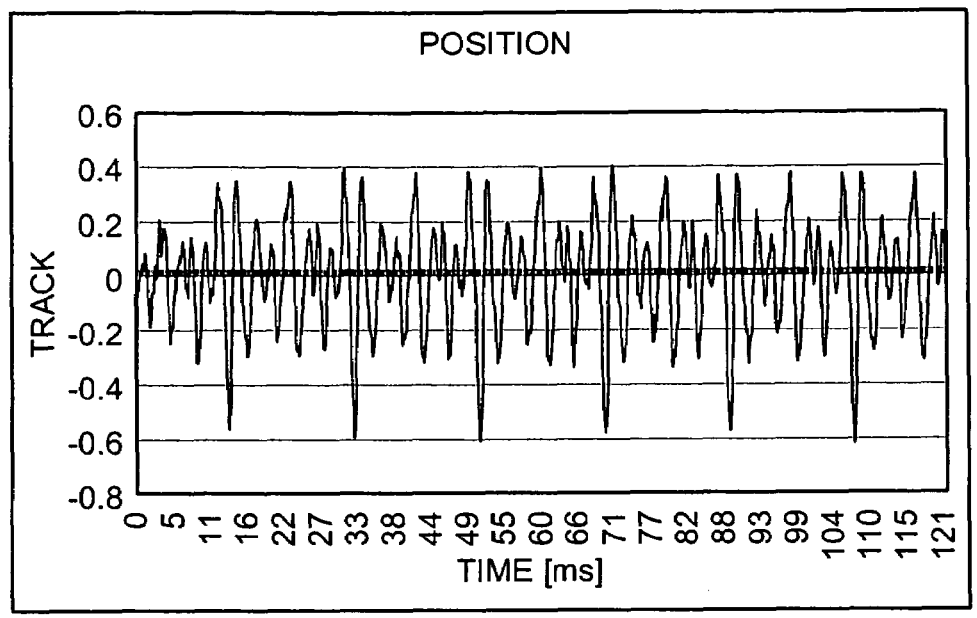
FIG. 4 is a graph for explaining a position signal, according to the first embodiment.

The position-signal storing unit 13a is a unit that stores a position signal. Specifically, as shown in FIG. 4, the position-signal storing unit 13a stores, for each predetermined time, a distance of shift of a position of the head from an original position for read/write.

Figure 5:
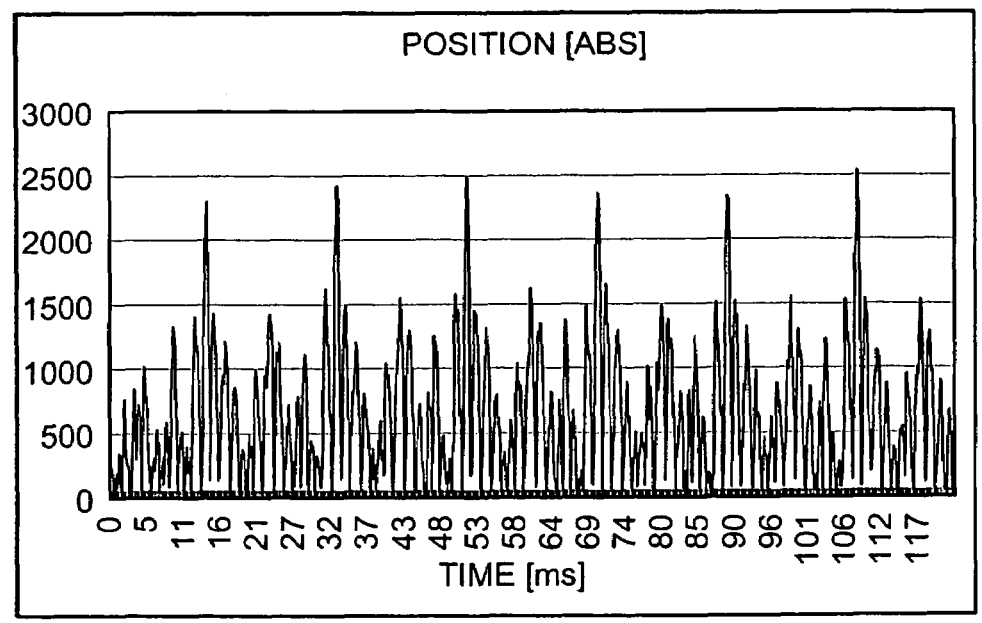
FIG. 5 is a graph for explaining an absolute value of the position signal, according to the first embodiment.
Figure 6:
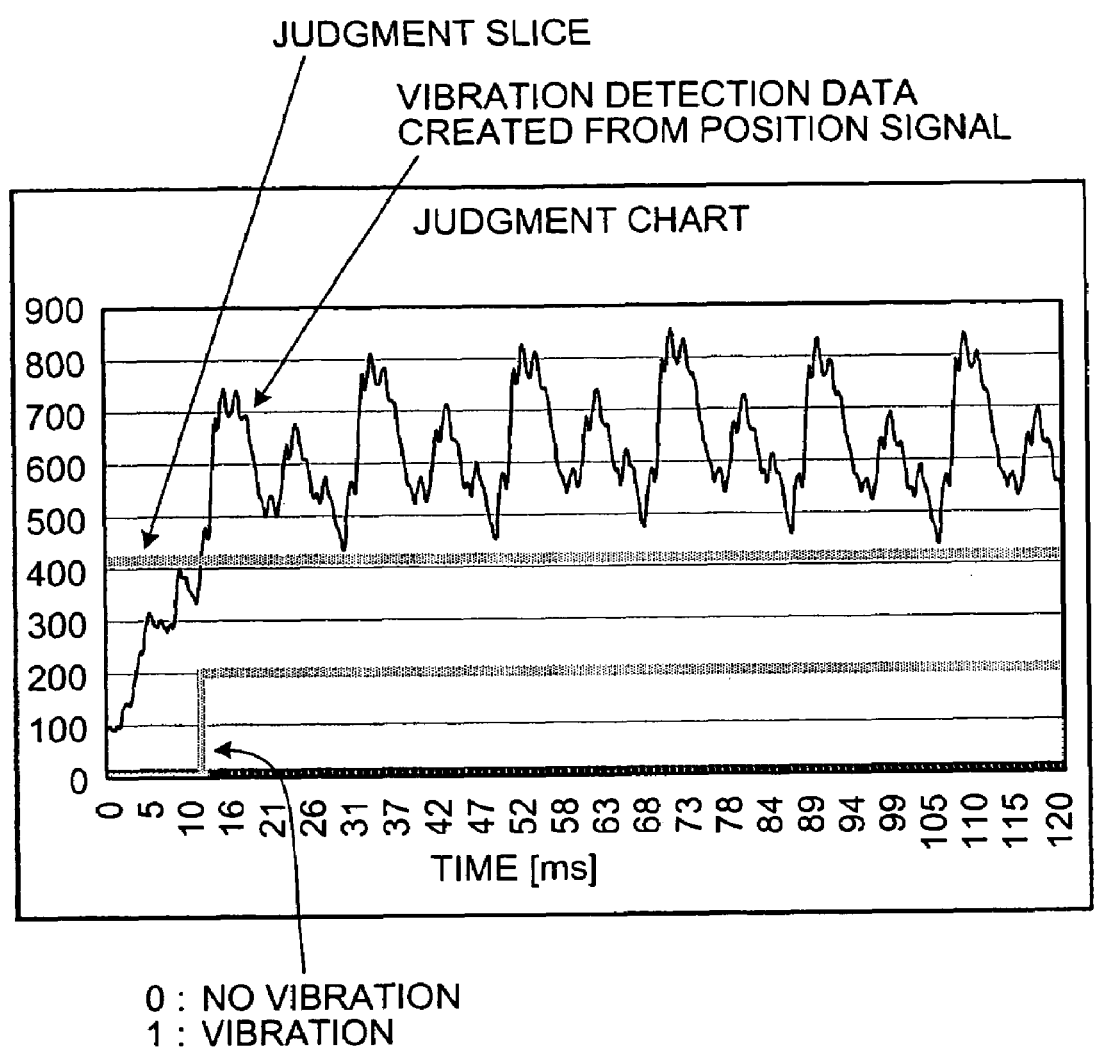
FIG. 6 is a graph for explaining vibration detection data, according to the first embodiment.

The vibration-detection storing unit 13b is a unit that stores an absolute value of the position signal and vibration detection data obtained by filtering the absolute value of the position signal with a low-pass filter. Specifically, as shown in FIG. 5, the vibration-detection storing unit 13b stores, for each predetermined time, an absolute value of the position signal stored in the position-signal storing unit 13a. As shown in FIG. 6, the vibration-detection storing unit 13b stores vibration detection data obtained by filtering the position signal with a low-pass filter.

The control unit 12 is a processing unit that has an internal memory for storing programs and required data defining procedures for various kinds of processing and the like and executes the various kinds of processing according to the programs and the data. In particular, the control unit 12 includes a position-signal acquiring unit 12a, a vibration detecting unit 12b, and a disk control unit 12c as units closely related to the present invention. The vibration detecting unit 12b corresponds to a "vibration detecting unit" described in claims and the disk control unit 12c corresponds to a "disk control unit" described in claims.

In the control unit 12, the position-signal acquiring unit 12a is a processing unit that acquires a position signal from the disk device 20. Specifically, the position-signal acquiring unit 12a acquires, for each predetermined time, a position signal from the disk device 20 and stores the position signal in the position-signal storing unit 13a.

The vibration detecting unit 12b is a processing unit that detects vibration caused in the disk device 20. Specifically, every time a position signal is acquired, as shown in FIG. 5, the vibration detecting unit 12b replaces the position signal stored in the position-signal storing unit 13a with an absolute value. As shown in FIG. 6, every time the position signal is replaced with the absolute value, the vibration detecting unit 12b filters the absolute value of the position signal with a low-pass filter to create vibration detection data and stores the vibration detection data in the vibration-detection storing unit 13b. Specifically, the vibration detection data is data that is created based on a distance of shift of a position of the head from an original position for read/write and duration in which the position of the head shifts from the original position for read/write. The vibration detecting unit 12b monitors vibration based on such vibration detection data stored. When vibration is detected (e.g., when a value of the vibration detection data is larger than a judgment slice that is a threshold value set in advance), the vibration detecting unit 12b notifies the disk control unit 12c that the vibration is detected.

After notifying the disk control unit 12c that the vibration is detected, the vibration detecting unit 12b monitors the vibration based on the vibration detection data stored by the vibration-detection storing unit 13b. When the vibration ends (e.g., when the vibration detection data is smaller than the judgment slice), the disk control unit 12c notifies the disk control unit 12c that the vibration ends.

Figure 7:
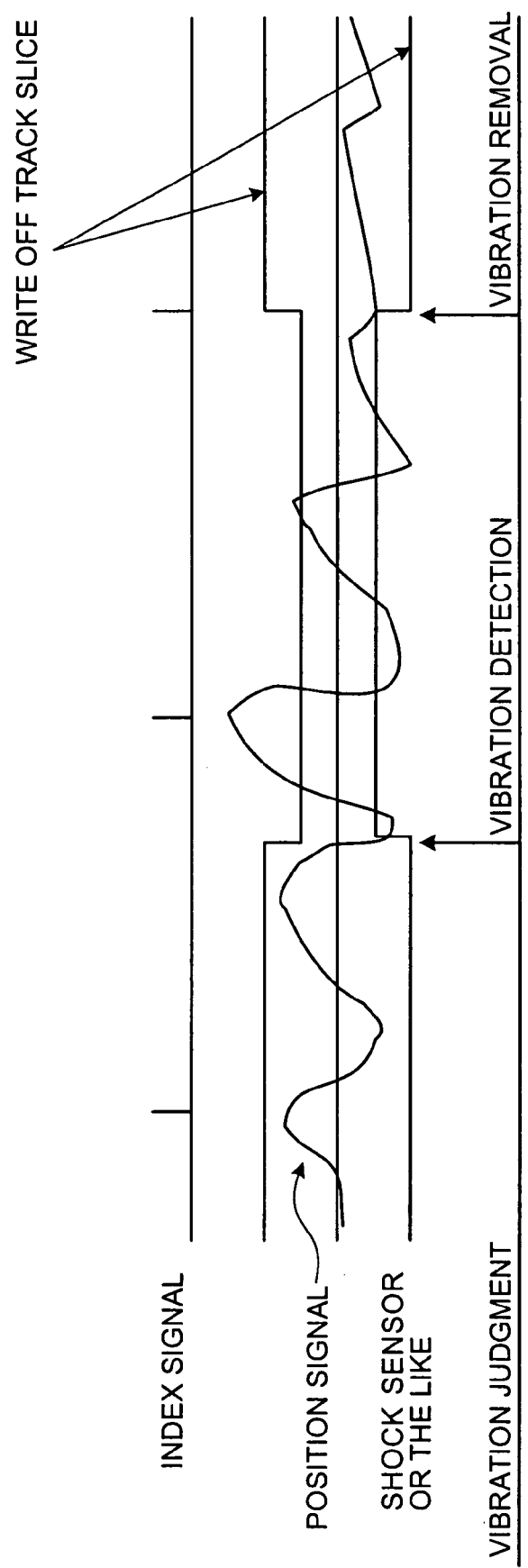
FIG. 7 is a schematic for explaining a disk control, according to the first embodiment.

The disk control unit 12c is a processing unit that controls the disk device 20 according to the vibration detected by the vibration detecting unit 12b. When it is notified by the vibration detecting unit 12b that vibration is detected, as shown in FIG. 7, the disk control unit 12c switches the write off track slice to the second level (a write off track slice in a vibration mode) lower than the first level (a write off track slice in a normal mode) to control the disk device 20. In other words, when the vibration is detected, the disk control apparatus 10 controls the disk device 20 to make the condition for stopping write of data in the disk device 20 stricter than that that at the normal time. The second level is set to, for example, about 80 percent of the first level.

On the other hand, when it is notified by the vibration detecting unit 12b that the vibration ends, as shown in FIG. 7, the disk control unit 12c switches the write off track slice from the second level to the first level to control the disk device 20. In other words, when the vibration ends, the disk control apparatus 10 controls the disk device 20 to make the condition for stopping write of data in the disk device 20 laxer than that at the normal time.

Figure 3:
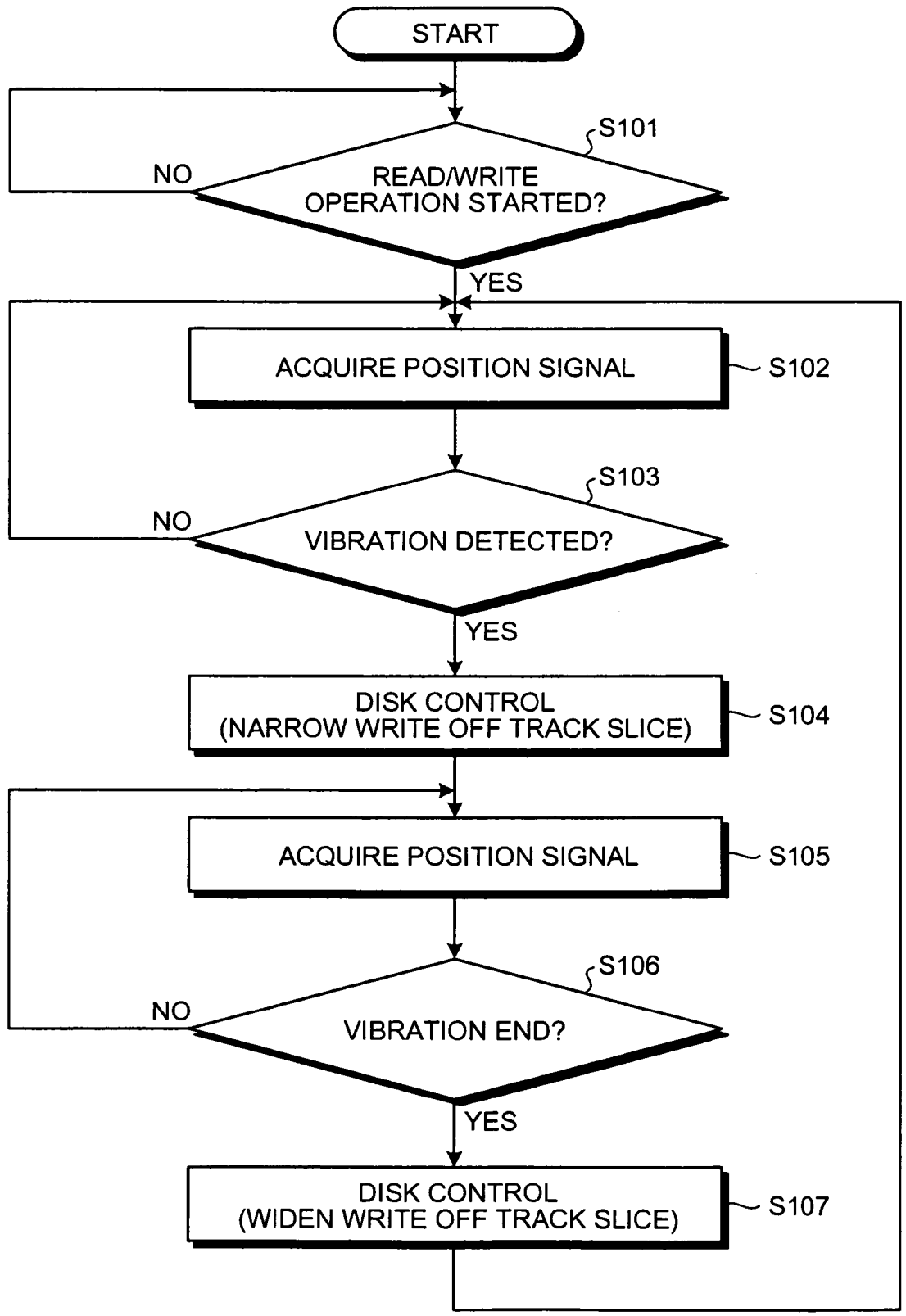
FIG. 3 is a flowchart of a processing procedure for a disk control process according to the first embodiment.

FIG. 3 is a flowchart of a processing procedure for a disk control process according to the first embodiment.

When the disk control apparatus 10 starts control of the disk device 20 that performs read/write of data (step S101), the position-signal acquiring unit 12a acquires, for each predetermined time, a position signal from the disk device 20 and stores the position signal in the position-signal storing unit 13a (step S102). The vibration detecting unit 12b judges whether vibration is detected (step S103). Specifically, as shown in FIG. 5, every time a position signal is acquired, the vibration detecting unit 12b replaces the position signal stored in the position-signal storing unit 13a with an absolute value. As shown in FIG. 6, every time the position signal is replaced with the absolute value, according to program processing, the vibration detecting unit 12b filters the absolute value of the position signal with a low-pass filter to create vibration detection data and stores the vibration detection data in the vibration-detection storing unit 13b. The vibration detecting unit 12b monitors vibration based on the vibration detection data stored in the vibration-detection storing unit 13b. When vibration is detected (e.g., when the vibration detection data is larger than a judgment slice) ("Yes" at step S103), the vibration detecting unit 12b notifies the disc control unit 12c that the vibration is detected.

Subsequently, when it is notified by the vibration detecting unit 12b that the vibration is detected, as shown in FIG. 7, the disk control unit 12c controls the disk device 20 to make a write off track slice strict (step S104). In other words, when the vibration is detected, the disk control apparatus 10 controls the disk device 20 to make a condition for stopping write of data in the disk device 20 stricter than that at the normal time.

The position-signal acquiring unit 12a acquires, for each predetermined time, a position signal from the disk device 20 and stores the position signal in the position-signal storing unit 13a (step S105). The vibration detecting unit 12b judges whether the vibration ends (step S106). Specifically, as shown in FIG. 5, every time a position signal is acquired, the vibration detecting unit 12b replaces the position signal stored in the position-signal storing unit 13a with an absolute value. As shown in FIG. 6, every time the position signal is replaced with the absolute value, the vibration detecting unit 12b filters the absolute value of the position signal with a low-pass filter to create vibration detection data and stores the vibration detection data in the vibration-detection storing unit 13b. The vibration detecting unit 12b monitors vibration based on the vibration detection data stored in the vibration-detection storing unit 13b. When the vibration ends (e.g., when the vibration detection data is smaller than the judgment slice) ("Yes" at step S106), the vibration detecting unit 12 notifies the disk control unit 12c that the vibration ends.

When it is notified by the vibration detecting unit 12b that the vibration ends, as shown in FIG. 7, the disk control unit 12c controls the disk device 20 to make the write off track slice lax (step S107). In other words, when the vibration is detected, the disk control apparatus 10 controls the disk device 20 to make the condition for stopping write of data in the disk device 20 lax. Thereafter, the disk control apparatus 10 returns to step S102 and repeats the processing described above.

As described above, according to the first embodiment, vibration caused in the disk device is detected to control the disk device according to the vibration detected. Thus, it is possible to appropriately perform disk control in a vibration state. In other words, it is possible to prevent write failure due to a reassign operation, write-out on an alternate primary side, and the like.

Furthermore, according to the first embodiment, vibration is detected using a position signal indicating a position of a head for performing read/write. Thus, it is possible to use a position signal used for usual disk control. As a result, it is possible to detect vibration caused in the disk device without using a new vibration detecting mechanism.

Moreover, according to the first embodiment, a position signal is filtered to detect vibration. Thus, it is possible to appropriately detect vibration caused in the disk device.

Furthermore, according to the first embodiment, when predetermined vibration is detected, the disk device is controlled to make a write off track slice, which is a condition for stopping write of data in the disk device, strict. Thus, it is possible to prevent write failure due to a reassign operation, write-out on an alternate primary side, and the like.

According to the first embodiment, the disk control apparatus 10 controls the disk device 20 to uniformly make a write off track slice strict without taking into account a TPI margin or the like peculiar to the disk device 20. However, the present invention is not limited to this. As shown in FIGS. 8 and 9, a write off track slice in the first level (the normal mode) may be made strict according to one or more of a TPI margin (a writing interval of a head for performing write in a disk device), temperature, and a customization level peculiar to each disk device.

For example, when a disk device has a TPI margin smaller than that of a usual disk device (a writing interval of a head for performing write in the disk device is narrow), to prevent writing shifted to an adjacent track due to vibration, a write off track slice in the second level (the vibration mode) is made stricter than that of the usual disk. It is possible to set a plurality of customization levels and temperatures shown in FIG. 9 in a memory as the first level (the write off track slice in the normal mode). The second level (the write off track slice in the vibration mode) is set in advance to about 80 percent of the first level and set in the memory to make it possible to switch the first level to the second level at the vibration time.

In this way, the write off track slice is made strict according to one or more of a characteristic, temperature, and a customization level of the head to control the disk device. Thus, it is possible to appropriately perform disk control in a vibration state according to respective disk devices.

Figure 10:
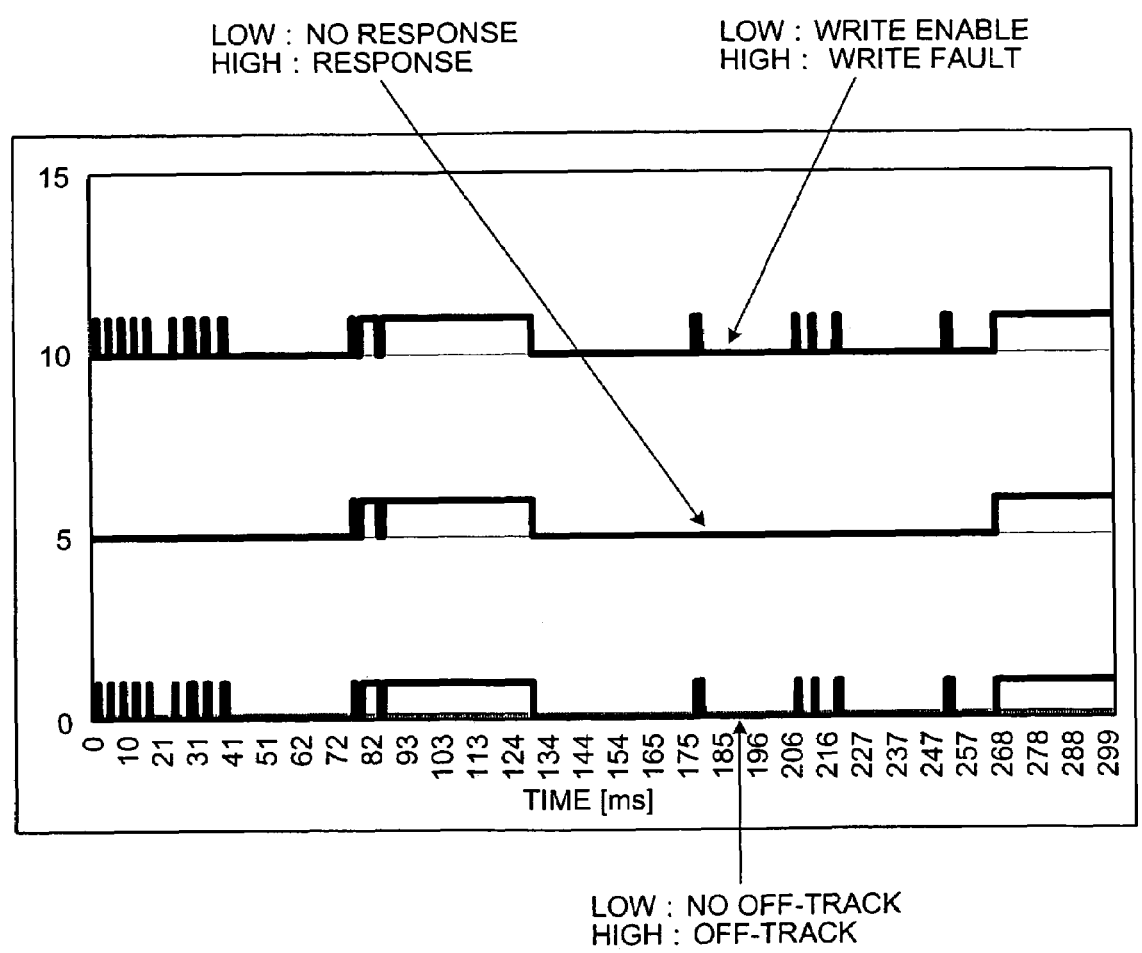
FIG. 10 is a graph for explaining occurrence of a write fault due to a position signal or a shock sensor, according to the second embodiment.

According to the first embodiment, vibration is detected using a position signal. However, the present invention is not limited to this. As shown in FIGS. 10 and 11, vibration may be detected using a rate of write fault occurrence indicating a rate of write failure. Specifically, as shown in FIG. 10, the disk control apparatus 10 acquires information on occurrence of off-track of a position and a response from a shock sensor from the disk device 20, and judges occurrence of a write fault based on the information. Moreover, as shown in FIG. 11, the disk control apparatus 10 calculates a rate of write fault occurrence (the number of faults/the number of samples) for each predetermined time to detect vibration. For example, as shown in FIG. 11, when a rate of write fault occurrence is 50 percent, the disk control apparatus 10 judges that vibration has occurred.

In this way, a rate of write fault occurrence indicating a rate of write failure is used to detect vibration. Thus, it is possible to use a write fault used for usual disk control. As a result, it is possible to detect vibration caused in the disk device 20 without using a new vibration detecting mechanism.

Figure 12:
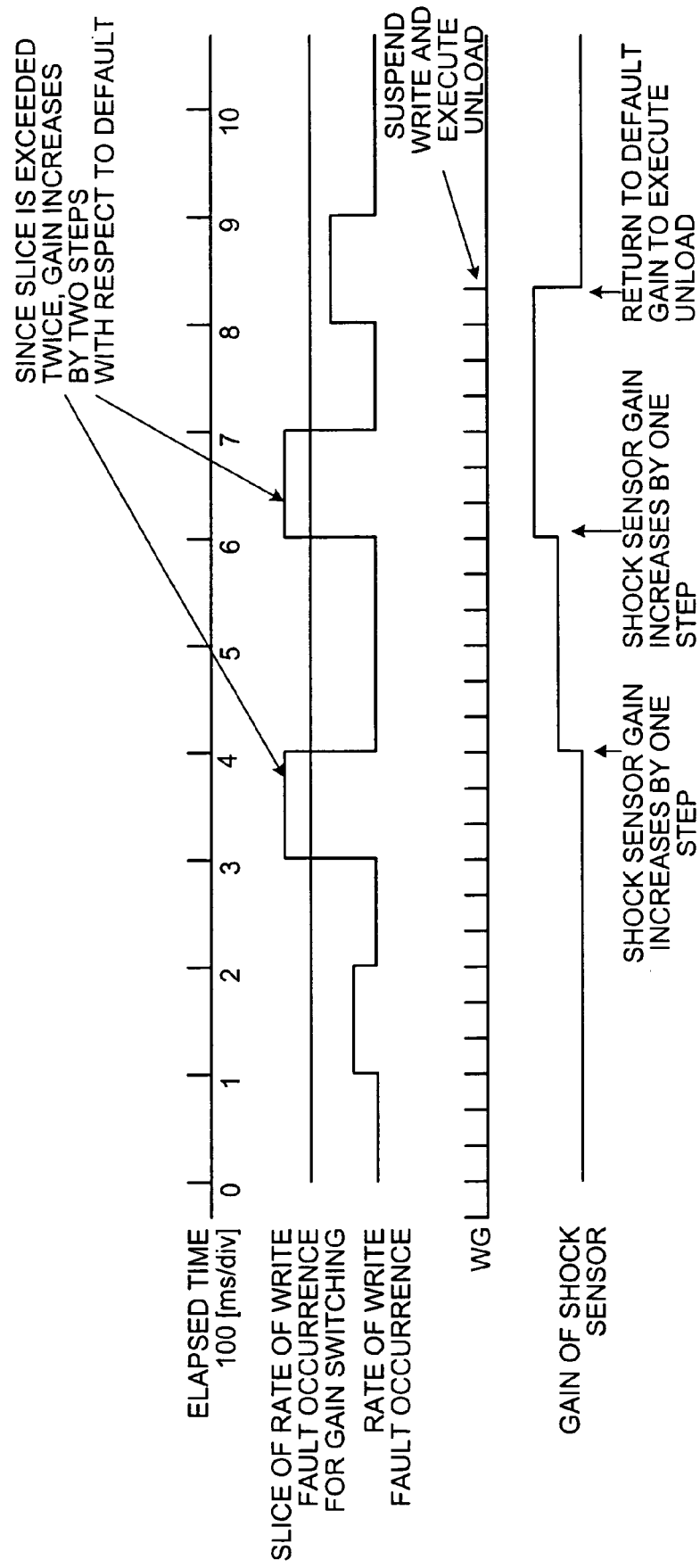
FIG. 12 is a schematic for explaining a switching of sensitivity of a shock sensor, according to the second embodiment.

According to the first embodiment, even when vibration caused in the disk device 20 is detected, the disk control apparatus 10 controls the disk device 20 while sensitivity of a shock sensor is fixed. However, the present invention is not limited to this. Sensitivity of the shock sensor may be switched according to a degree of the vibration detected. Specifically, as shown in FIG. 12, the disk control apparatus 10 monitors a rate of write fault occurrence and, if the rate of write fault occurrence is equal to or higher than a slice of a rate of write fault occurrence for gain switching that is a predetermined threshold value, increases sensitivity of the shock sensor by one step (e.g. about 15 percent). Thereafter, when the rate of write fault occurrence increases to be equal to or higher than the slice of a rate of write fault occurrence for gain switching again, the disk control apparatus 10 increases sensitivity of the shock sensor by one more step.

In this way, sensitivity of the shock sensor is switched according to the detected vibration to control write performance and vibration resistance. Thus, it is possible to perform appropriate disk control corresponding to a vibration state.

Figure 13:
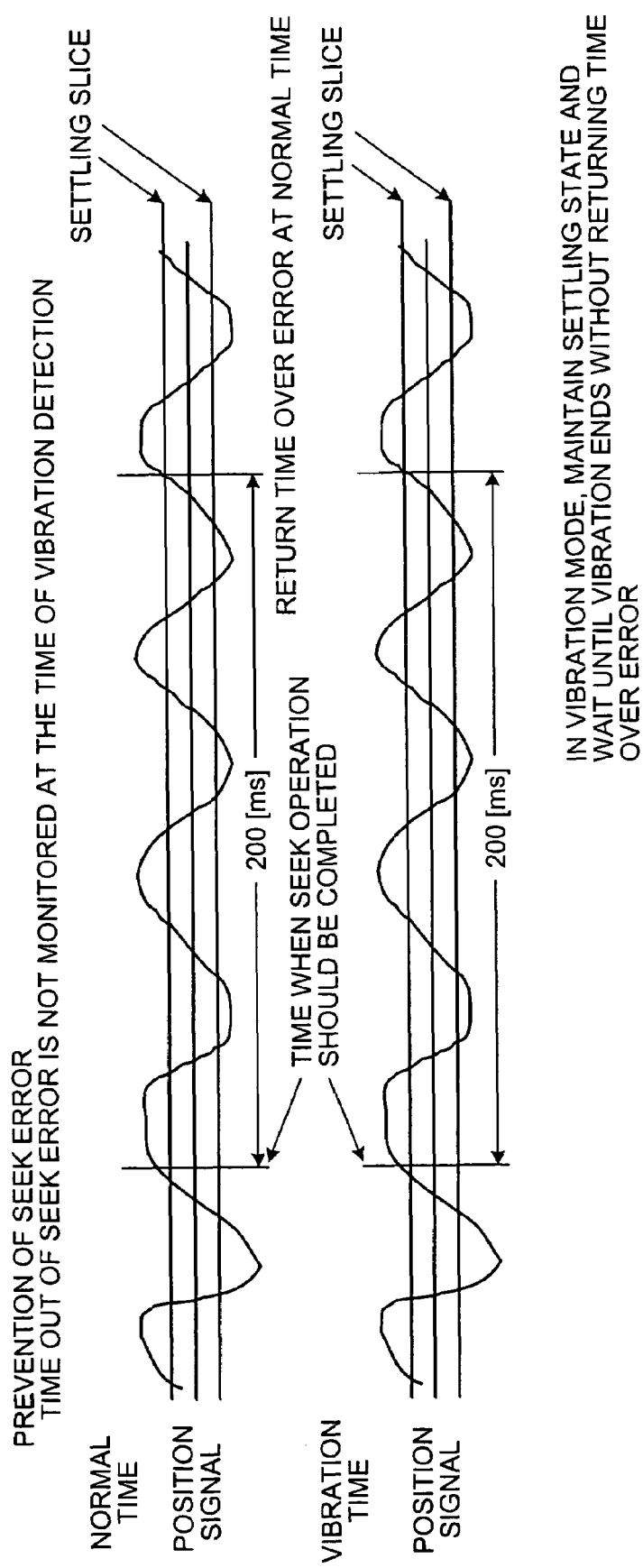
FIG. 13 is a schematic for explaining a correspondence between seek errors at normal time and vibration time, according to the second embodiment.

According to the present invention, as shown in FIG. 13, when vibration is detected, the disk control apparatus 10 may reject a seek error signal and maintain a settling state. At the normal time, the disk control apparatus 10 accepts a seek error signal due to time over in processing of a disk device control program to stop the settling state. On the other hand, when vibration is detected, the disk control apparatus 10 rejects a seek error signal due to time over to perform control for maintaining the settling state until the vibration ends.

In this way, when vibration is detected, the disk control apparatus 10 rejects a seek error signal and maintains the settling state. Thus, the disk control apparatus 10 performs a seek operation immediately after the vibration disappears without suspending settling. As a result, it is possible to quickly perform a seek operation compared with the time when settling is suspended to perform a seek operation again.

The respective components of the devices shown in the figures are functionally conceptual and are not always required to be physically constituted as shown in the figures. A specific form of distribution and integration of the devices is not limited to that shown in the figures. It is possible to physically distribute and integrate all or a part of the devices by an arbitrary unit according to various loads and a state of use. For example, the disk control apparatus 10 and the disk device 20 shown in FIG. 2 may be integrated to constitute a disk device or a disk control apparatus. Moreover, all or an arbitrary part of the respective processing functions performed by the devices could be realized by a central processing unit (CPU) and programs analyzed and executed in the CPU or realized as hardware according to a wired logic.

It is also possible to manually perform all or a part of the kinds of processing explained as being automatically performed among the various kinds of processing explained in the embodiments. It is also possible to automatically perform, according to a publicly-known method, all or a part of the kinds of processing explained as being manually performed. Besides, it is possible to arbitrarily change the processing procedures, the control procedures, the specific names, and the information including various data and parameters described and shown in the specification and the drawings except the cases specified below.

It is possible to realize the various kinds of processing explained in the embodiments by executing programs prepared in advance with a computer. FIG. 14 is a block diagram of a computer 100 that executes a disk control program.

The computer 100 serving as the disk control apparatus 10 is constituted by connecting a hard disk drive (HDD) 110, a random access memory (RAM) 120, a read only memory (ROM) 130, a CPU 140, and a bus 150.

Disk control programs showing functions same as those in the embodiments, that is, a position signal acquiring program 131, a vibration detecting program 132, and a disk control program 133 shown in FIG. 14 are stored in the ROM 130 in advance. The programs 131 to 133 may be integrated or distributed according to circumstances in the same manner as the components of the disk control apparatus 10 shown in FIG. 2.

The CPU 140 reads out the programs 131 to 133 from the ROM 130 and executes the programs. Consequently, the respective programs 131 to 133 function as a position signal acquiring process 141, a vibration detecting process 142, and a disk control process 143. The respective processes 141 to 143 correspond to the position-signal acquiring unit 12*a*, the vibration detecting unit 12*b*, and the disk control unit 12*c* shown in FIG. 2.

The HDD 110 includes a data buffer memory that stores a position signal table 111, a vibration detection table 112, and the like read out from a system area of a disk medium.

The position signal table 111 and the vibration detection table 112 correspond to the position-signal storing unit 13*a* and the vibration-detection storing unit 13*b* shown in FIG. 2. The CPU 140 registers a position signal in the position signal table 111. The CPU 140 reads out position signal data 121 and vibration detection data 122 from the position signal table 111 and the vibration detection table 112 and stores the data in the RAM 120. The CPU 140 executes processing for controlling a disk device based on the position signal data 121 and the vibration detection data 122 stored in the RAM 120.

According to the present invention, it is possible to appropriately perform disk control in a vibration state. In other words, it is possible to prevent write failure due to a reassign operation, write-out on an alternate primary side, and the like.

Furthermore, according to the present invention, it is possible to detect vibration caused in the disk driving unit without using a new vibration detecting mechanism.

Moreover, according to the present invention, it is possible to appropriately detect vibration caused in the disk driving unit.

Furthermore, according to the present invention, it is possible to use a write fault used for usual disk control. As a result, it is possible to detect vibration caused in the disk device without using a new vibration detecting mechanism.

Moreover, according to the present invention, it is possible to use any one of a shock sensor and a position signal used for usual disk control. As a result, it is possible to detect vibration caused in the disk driving unit.

Furthermore, according to the present invention, it is possible to prevent write failure due to a reassign operation, write-out on an alternate primary side, and the like.

Moreover, according to the present invention, it is possible to more appropriately perform disk control in a vibration state according to individual disk devices.

Furthermore, according to the present invention, it is possible to perform appropriate disk control corresponding to a vibration state.

Moreover, according to the present invention, it is possible to quickly perform a seek operation compared with the time when settling is suspended to perform a seek operation again.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A disk control apparatus that controls a disk driving unit that performs read/write of data with a head, the disk control apparatus comprising:

a vibration detecting unit that detects a vibration of the disk driving unit using a rate of write fault occurrence, the rate of write fault occurrence being obtained from at least one of a shock sensor and the position signal; and a disk control unit that controls the disk driving unit to switch a sensitivity of the shock sensor based on the detected vibration.

2. The disk control apparatus according to claim 1, wherein the disk control unit tightens, when a predetermined vibration is detected, a write off track slice that is a condition for stopping the write of data in a disk.

3. The disk control apparatus according to claim 2, wherein
the disk control unit tightens the write off track slice based on at least one of a characteristic, a temperature, and a customization level of the head.

4. The disk control apparatus according to claim 1, wherein
the disk control unit rejects, when the vibration is detected, a seek error signal, and maintains a settling state.

5. A method of controlling a disk driving unit that performs read/write of data with a head, the method comprising:
detecting a vibration of the disk driving unit using a rate of write fault occurrence, the rate of write fault occurrence being obtained from at least one of a shock sensor and the position signal; and
controlling the disk driving unit to switch a sensitivity of the shock sensor based on the detected vibration.

6. A computer-readable recording medium that stores a computer program for controlling a disk driving unit that performs read/write of data with a head, wherein
the computer program causes a computer to execute:
detecting a vibration of the disk driving unit using a rate of write fault occurrence, the rate of write fault occurrence being obtained from at least one of a shock sensor and the position signal; and
controlling the disk driving unit based on the detected vibration to switch a sensitivity of the shock sensor.

7. A disk control apparatus that controls a disk driving unit that performs read/write of data with a head, the disk control apparatus comprising:
a vibration detecting unit that detects a vibration of the disk driving unit: and
a disk control unit that controls the disk driving unit based on the detected vibration,
wherein the disk control unit rejects, when the vibration is detected, a seek error signal, and maintains a settling state.

8. The disk control apparatus according to claim 7, wherein
the vibration detecting unit detects the vibration using a position signal indicating a position of the head.

9. The disk control apparatus according to claim 8, wherein
the vibration detecting unit detects the vibration by filtering the position signal.

10. The disk control apparatus according to claim 7, wherein
the vibration detecting unit detects the vibration using a rate of write fault occurrence.

11. The disk control apparatus according to claim 10, wherein
the rate of write fault occurrence is obtained from at least one of a shock sensor and the position signal.

12. The disk control apparatus according to claim 11, wherein
the disk control unit controls the disk driving unit to switch a sensitivity of the shock sensor based on the detected vibration.

13. The disk control apparatus according to claim 7, wherein
the disk control unit tightens, when a predetermined vibration is detected, a write off track slice that is a condition for stopping the write of data in a disk.

14. The disk control apparatus according to claim 13, wherein
the disk control unit tightens the write off track slice based on at least one of a characteristic, a temperature, and a customization level of the head.

* * * * *